United States Patent
Parras

(10) Patent No.: US 8,135,503 B2
(45) Date of Patent: Mar. 13, 2012

(54) GROUND PROXIMITY SENSOR

(75) Inventor: Gerald Parras, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/768,220

(22) Filed: Apr. 27, 2010

(65) Prior Publication Data

US 2011/0264314 A1    Oct. 27, 2011

(51) Int. Cl.
*F02K 1/64* (2006.01)
*G06F 19/00* (2006.01)

(52) U.S. Cl. ............ 701/16; 701/7; 701/8; 244/183

(58) Field of Classification Search .......... 701/16, 701/7, 8, 10; 244/183, 175, 135 B, 12.4
See application file for complete search history.

(56) References Cited

U.S. PATENT DOCUMENTS

| | | | |
|---|---|---|---|
| 3,348,412 A | 10/1967 | Lode | |
| 4,828,203 A * | 5/1989 | Clifton et al. | 244/12.3 |
| 4,924,401 A | 5/1990 | Bice et al. | |
| 5,178,344 A * | 1/1993 | Dlouhy | 244/12.2 |
| 5,186,415 A | 2/1993 | Li | |
| 5,359,888 A | 11/1994 | Hagen | |
| 5,544,526 A | 8/1996 | Baltins et al. | |
| 6,170,778 B1 * | 1/2001 | Cycon et al. | 244/6 |
| 6,445,310 B1 | 9/2002 | Bateman et al. | |
| 6,464,459 B2 * | 10/2002 | Illingworth | 415/208.2 |
| 6,616,094 B2 * | 9/2003 | Illingworth | 244/12.1 |
| 7,095,364 B1 | 8/2006 | Rawdon et al. | |
| 7,841,563 B2 * | 11/2010 | Goossen et al. | 244/175 |
| 2002/0072832 A1 | 6/2002 | Bachinski et al. | |
| 2003/0135327 A1 | 7/2003 | Levine et al. | |
| 2009/0189787 A1 | 7/2009 | Khatwa | |

FOREIGN PATENT DOCUMENTS

| | | |
|---|---|---|
| EP | 1 840 578 A2 | 10/2007 |
| EP | 1 995 174 A2 | 11/2008 |
| WO | WO 99/32963 A1 | 7/1999 |
| WO | WO 00/67039 A1 | 11/2000 |

OTHER PUBLICATIONS

Robert E. Curry, "Dynamic Ground Effect for a Cranked Arrow Wing Airplane," NASA Technical Memorandum 4799, 20 pages, Aug. 1997.
Dott, Ing. Alessandro Rossetti, "Design and Development of New Pressure Sensors for Aerodynamic Applications," Alma Mater Studiorum—Universita di Bologna, 172 pgs., 2008.
European Search Report from corresponding EP Application No. 11162879.8, mailed Sep. 5, 2011, 3 pages.
Examination Report from counterpart EP Application No. 11162879.8, mailed Sep. 19, 2011, 6 pages.
Reply to communication from the Examining Division, for counterpart EP Application No. 11162879.8, dated Jan. 18, 2012 (15 pages).

* cited by examiner

Primary Examiner — Tan Q Nguyen
(74) Attorney, Agent, or Firm — Shumaker & Sieffert, P.A.

(57) ABSTRACT

An unmanned aerial vehicle comprises a housing, a rotor that is rotated to propel the housing, a pressure sensor that generates a signal indicative of an air pressure proximate a bottom surface of the housing, and a processor configured to determine, based on the signal, when an increase in air pressure proximate the bottom surface is greater than or equal to a threshold value associated with the ground effect of the rotor, wherein the processor controls the rotor to cease rotating or decrease rotational speed to land the unmanned aerial vehicle upon determining that the increase in pressure is greater than or equal to the threshold value.

20 Claims, 7 Drawing Sheets

GROUND PROXIMITY SENSOR

TECHNICAL FIELD

This disclosure relates to ducted-fan air vehicles, such as unmanned aerial vehicles.

BACKGROUND

Ducted-fan air-vehicles, and in particular, unmanned air-vehicles (UAVs) implementing ducted-fans, are increasingly being deployed in battlefield scenarios. An unmanned aerial vehicle (UAV) is an aircraft that flies without a human crew on board the aircraft. A UAV can be used for various purposes, such as reconnaissance and surveillance, navigating for troops and ground vehicles, and non-line-of-sight targeting. Accordingly, a UAV may be configured to detect enemy troops and vehicles in areas where ground forces (or even aerial forces) lack a direct line-of-sight.

SUMMARY

In general, the disclosure is directed to a ground proximity sensing system for an unmanned aerial vehicle (UAV) that utilizes the phenomenon of ground effect to detect proximity to a landing surface. In some examples, the ground proximity sensing system detects proximity to a landing surface by determining whether a pressure increase proximate a bottom surface of the UAV is associated with ground effect. The use of ground effect allows the ground proximity sensing system to determine that the UAV is close enough to a landing surface to cease or slow rotation of a rotor, such as a fan of a ducted fan UAV, and allow the UAV to land without adverse effects that may result from landing when the rotor is rotating at too high of a speed.

In one example, the disclosure is directed to an unmanned aerial vehicle comprising a housing, a rotor that is rotated to propel the housing, a pressure sensor that generates a signal indicative of an air pressure proximate a bottom surface of the housing, and a processor configured to determine, based on the signal, when an increase in air pressure proximate the bottom surface is greater than or equal to a threshold value associated with the ground effect of the rotor, wherein the processor controls the rotor to cease rotating or decrease rotational speed to land the unmanned aerial vehicle upon determining that the increase in pressure is greater than or equal to the threshold value.

In another example, the disclosure is directed to a method comprising determining a pressure proximate a bottom surface of an air vehicle, the air vehicle comprising a rotor for propelling the air vehicle, determining if an increase in air pressure proximate the bottom surface of the air vehicle is greater than or equal to a threshold value associated with ground effect of the rotor, and controlling the rotor to cease rotation or slow rotational speed to land the air vehicle upon determining that the increase in pressure is greater than or equal to the threshold value.

In another example, the disclosure is directed to a method of determining that an unmanned aerial vehicle is proximate the ground, the method comprising determining a first pressure proximate a bottom surface of the unmanned aerial vehicle, the unmanned aerial vehicle comprising a rotor for propelling the unmanned aerial vehicle, descending the unmanned aerial vehicle, during the descent of the unmanned aerial vehicle, determining a second pressure proximate the bottom surface of the unmanned aerial vehicle, determining a difference between the first pressure and the second pressure, and controlling the rotor to cease rotation or decrease rotational speed to land the unmanned aerial vehicle if the difference is equal to or greater than a threshold value associated with ground effect of the rotor.

In another example, the disclosure is directed to an article of manufacture comprising a computer-readable storage medium comprising instructions. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, random access memory or RAM) or any other type of volatile or non-volatile memory that stores instructions (e.g., in the form of a computer program or other executable instructions).

The details of one or more examples of the disclosure are set forth in the accompanying drawings and the description below. Other features, objects, and advantages of the systems, methods, and devices in accordance with the disclosure will be apparent from the description and drawings, and from the claims.

DETAILED DESCRIPTION

Figure 1:
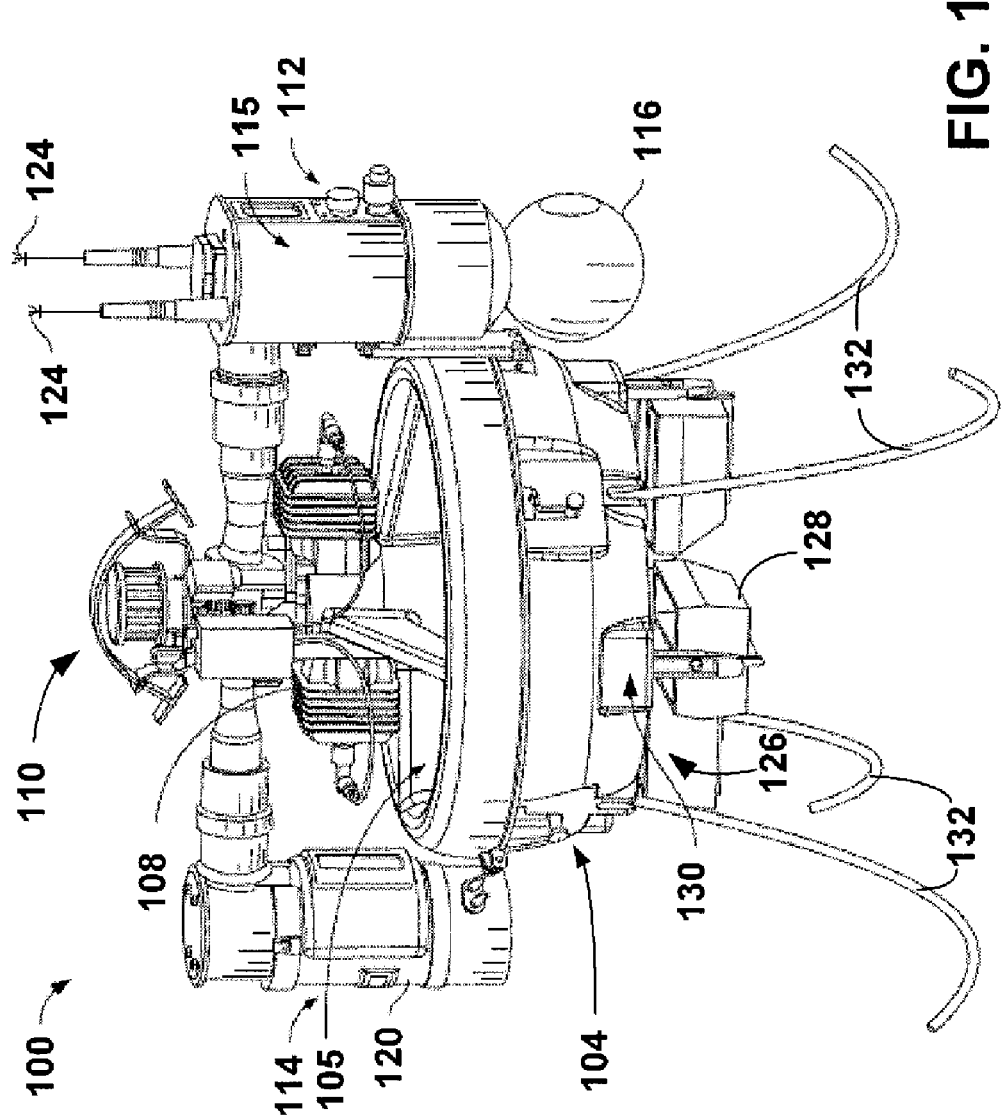
FIG. 1 is a perspective view of an example unmanned aerial vehicle (UAV).

In general, this disclosure is directed to a ducted-fan air vehicle and may take the form of an unmanned aerial vehicle (UAV), such as a micro air vehicle (MAV). A ducted-fan air vehicle described herein includes a system for detecting proximity of the air vehicle to the ground, which can be useful for various purposes, such as landing the air vehicle. The ground proximity sensing system includes a ground proximity sensor that takes advantage of the ground effect caused by a rotor of the air vehicle, such as the fan of a ducted-fan air vehicle, when the air vehicle is proximate to a landing surface, such as the ground. Ground effect occurs because the rotor creates lift by forcing air downward, and when the air vehicle is close enough to the landing surface, the landing surface restricts the downward flow of air, creating an area of higher pressure, similar to a cushion of air, proximate a bottom surface of the air vehicle, e.g., between the bottom surface and the landing surface. A bottom surface of the air vehicle can be, for example, a surface of the air vehicle generally facing the landing surface when the air vehicle is landing, where the surface is large enough to restrict the flow of air between the air vehicle and the landing surface. For example, in some UAVs, the bottom surface can be on a duct housing in which the rotor is positioned. The bottom surface can be, but need not be, the surface of the air vehicle closest to the landing surface when the air vehicle is landing.

The ground proximity sensor comprises a pressure sensor that generates a signal (e.g., an electrical signal) indicative of an air pressure proximate a bottom surface of the air vehicle in order to detect an increase in pressure associated with the ground effect of the rotor. The ground proximity sensing system further includes a processor that is configured to determine, based on analysis of the signal generated by the pressure sensor, when an increase in pressure proximate the bottom surface is greater than or equal to a threshold value that is associated with the ground effect. The threshold value, therefore, represents a change in pressure from a first time period to a second time period, examples of which are described below. When the processor makes this determination, it may control the rotor to cease or slow the rotor's rotational speed so that the air vehicle can land. A ground proximity sensing system that utilizes the pressure increase associated with the ground effect provides for a reliable ground proximity sensor at a low cost compared to existing sensor systems that rely on, for example, ultrasonic waves to determine a distance between a air vehicle and a landing surface.

In some examples, the ducted-fan air vehicle that includes the ground proximity sensing system may also take the form of an organic air vehicle (OAV). Currently, the United States government has funded development of two classes of OAVs—smaller-class I OAVs and larger-class II OAVs. This disclosure will describe the ducted-fan air vehicle by way of example with reference to a UAV. However, the ground proximity sensing system can be included in any suitable air vehicles, such as class I or class II OAVs, as well as other types of OAVs, MAVs, and ducted-fan air-vehicles.

Figure 2:
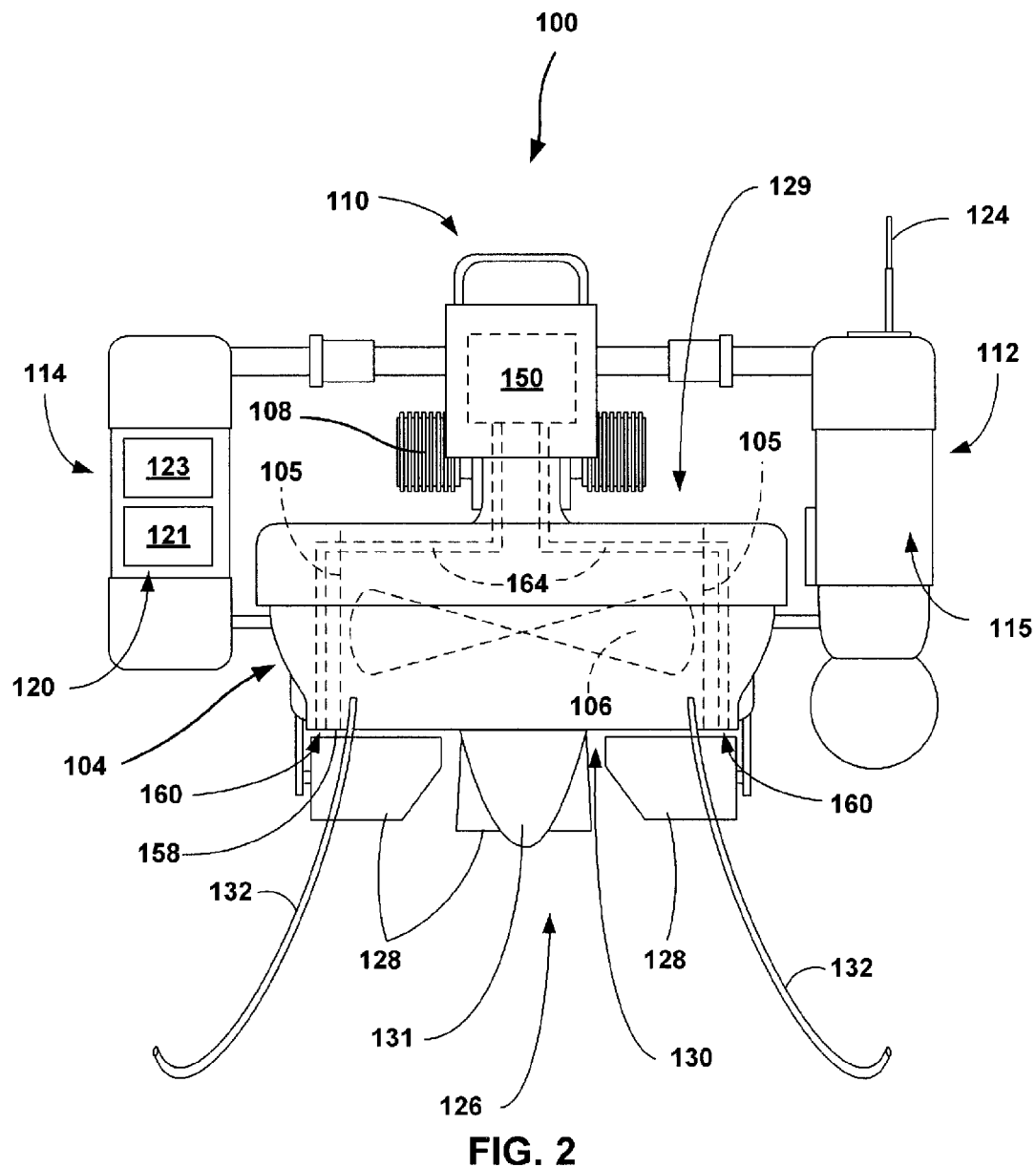
FIG. 2 is a side view of the example UAV of FIG. 1.
Figure 3:
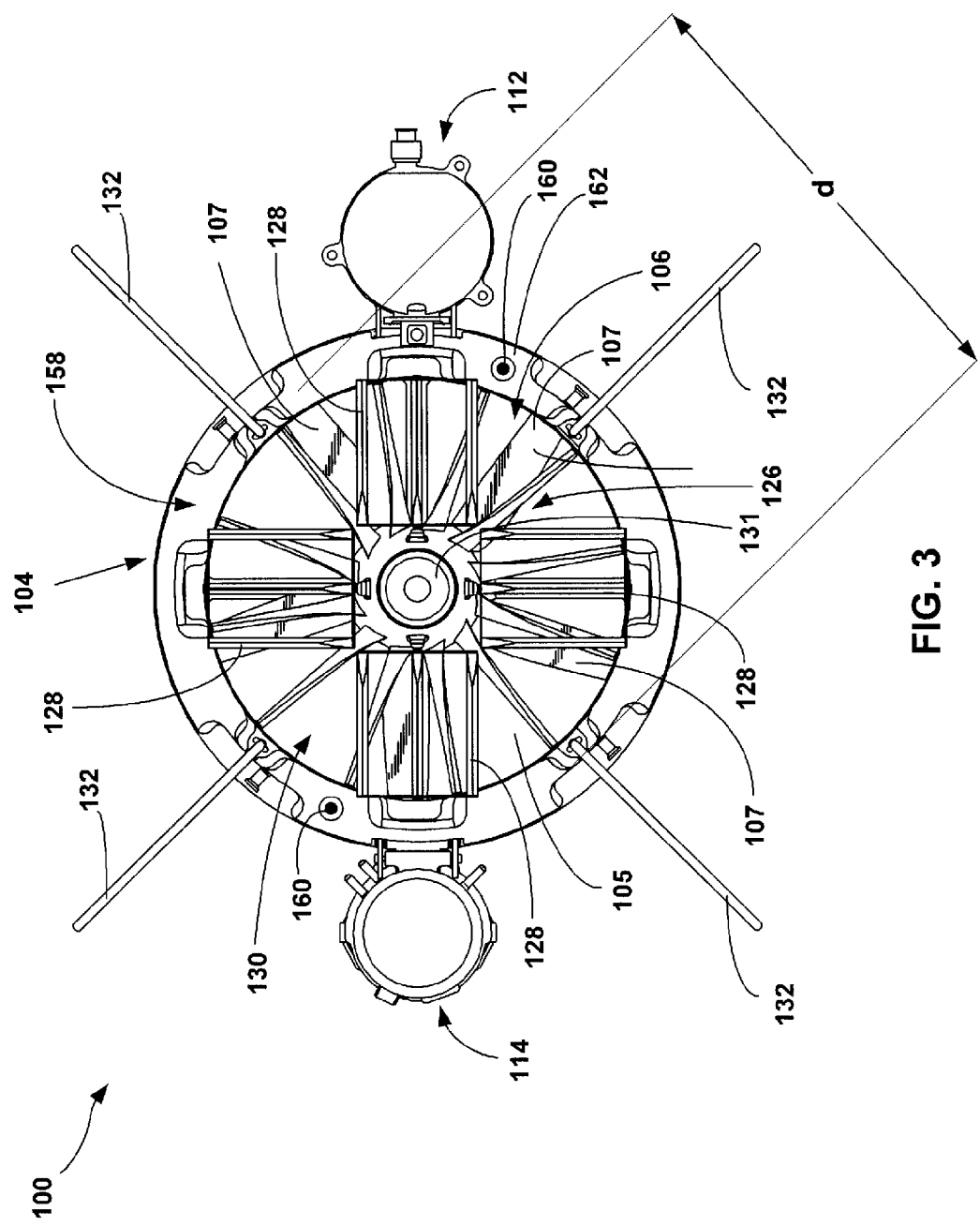
FIG. 3 is a plan view of the example UAV of FIG. 1, which illustrates a bottom surface of the UAV.

FIGS. 1-3 illustrate an example UAV 100, which includes a ground proximity sensing system that determines if UAV 100 is proximate to a landing surface based on a change in pressure (e.g., a pressure gradient) proximate a bottom surface of UAV 100 resulting from a ground effect. UAV 100 may include a housing 104 and a rotor 106 (also referred to as a fan 106 or rotor fan 106) (shown in FIG. 3), located within an air duct 105 passing through housing 104, and an engine 108 to drive rotor 106. Rotor 106 provides for the propulsion of UAV 100 by creating an air flow capable of creating sufficient lift so that UAV 100 may fly above the ground. UAV 100 may also include a center body 110, which may include components for the operation of UAV 100, such as engine 108 for powering rotor 106 and one or more pods that house additional components. In FIG. 1, engine 108 is located toward the inlet end of air duct 105 and is mechanically connected (either directly or indirectly) to rotor 106.

In some examples, UAV 100 includes a rotor assembly that includes rotor 106 stator assembly 126, and tail cone 131. In such examples, rotor 106, stator assembly 126, and tail cone 131 may be arranged axially in the direction of flow through duct 105 formed by duct housing 104. Stator assembly 126 may be located under rotor 106 located within the duct housing 104. Stator assembly 126 may direct the flow air through duct 105, e.g., to counteract the torque produced by rotor 106. In one example, rotor 106 comprises a fan having a plurality of blades 107 that extend axially from the center of rotor 106, such as the five blades 107 best seen in FIG. 3. In operation, rotor 106 rotates to draw a working medium gas including, e.g., air, into duct inlet 129. The working medium gas is drawn through the rotor assembly by rotor fan 106, directed by stator assembly 126 and accelerated out of duct outlet 130 around tail cone 131. The acceleration of the working medium gas through duct 105 generates lift to propel UAV 100. Control vanes 128 may be controlled by a controller on board UAV 100 or a remote controller to direct UAV 100 along a particular trajectory, i.e., a flight path. In this manner, engine 108 drives ducted rotor fan 106 to propel UAV 100 in flight. Duct housing 104 may be formed of any suitable material including, e.g., various composites, aluminum or other metals, a semi rigid foam, various elastomers or polymers, aeroelastic materials, or even wood.

UAV 100 may also include control vanes 128. Control vanes 128 may be located under rotor 106, and may operate to create control moments for UAV 100 (e.g., to direct UAV 100 in a particular flight path) by controlling the direction of the air flow produced by rotor 106. In one example, control vanes 128 are placed slightly below an outlet 130 of air duct housing 104. UAV 100 may contain fixed and/or movable vanes. Once UAV 100 has launched, control vanes 128 can receive control signal from avionics processor 121 or another processor (e.g., a remote processor separate from UAV) to control the direction of flight of UAV 100. Control vanes 128 move in response to the signals, altering the course of airflow from rotor 106, which in turn controls and guides the direction of propulsion of rotor 106, and thus the direction of flight for UAV 100.

In one example, UAV 100 includes pod 112 and pod 114, which can be, for example, payload and avionics pods. In the example shown in FIG. 1, pod 112 may include one or more sensors, such as a gimbaled sensor (e.g., a gimbaled camera 116 in the example shown in FIGS. 1-3). Pod 112 may also house other components, such as a gimbaled camera control system 115, GPS, a radio, and a video link for imagery. Gimbaled camera control system 115 may include any combination of hardware, firmware, and/or software operable to interpret and execute instructions, e.g., from a software application. For example, gimbaled camera control system 115 may include a microcontroller, a microprocessor, or an application-specific integrated circuit (ASIC). Gimbaled camera 116 may be an electro-optical camera for daylight operations or infrared cameras for night missions. Any camera suitable for any type or time of mission may be used. However, pod 112 can include any suitable sensors, and, in some examples, does not include sensors. For example, pod 112 can be dedicated to carrying a payload.

In one example, pod 114 may be configured to carry an avionics package including as well as flight control electronics and sensors. In one example, pod 114 includes an avionics system 120 comprising avionics for communicating to and from UAV 100 and navigating UAV 100, and flight control electronics and sensors. For example, in the example shown in FIGS. 1-3, pod 114 includes a processor 121 (shown schematically in FIG. 2). Avionics processor 121 may be any combination of hardware, firmware, and/or software operable to interpret and execute instructions, e.g., from a software application. For example, avionics processor 121 pod can include any one or more of a microprocessor, a controller, a digital signal processor (DSP), an application specific integrated circuit (ASIC), a field-programmable gate array (FPGA), or discrete logic circuitry. The functions attributed to processor 121, as well as other processors described herein, may be embodied in a hardware device via software, firmware, hardware or any combination thereof.

Avionics processor 121 may control both avionics system 120 and gimbaled camera control system 115, or gimbaled camera control system 115 and avionics system 120 may be controlled by separate processors. Avionics system 120 may also include a memory 123 for storing data about the flight of UAV 100, as well as instructions for execution by processor 121. Avionics system 120 may be coupled to gimbaled camera control system 115 and gimbaled camera 116. In conjunction with gimbaled camera 116 and gimbaled camera control system 115, avionics system 120 may control UAV 100 by controlling the altitude, positioning, and forward speeds of UAV 100. Avionics system 120 in conjunction with gimbaled camera control system 115 may control UAV 100 using various inputs. In one example, avionics system 120 may use inputs, such as gimbaled camera angles, inertial sensors, GPS, and airflow speed and direction, in order to control UAV 100.

UAV components located in pods 112, 114 may be arranged in other ways. Further, additional pods or fewer pods are possible. In one example, the pods and components stored in them are preferably selected in order to maintain the center of gravity of UAV 100. UAV 100 may also include an antenna or antennas 124 that allow UAV 100 (e.g., avionics processor 121) to receive and transmit signals, such as navigation signals, control signals, and imagery signals.

UAV 100 may also include landing gear 132 with which UAV 100 may land upon a landing surface, e.g., the ground. In the example shown in FIGS. 1 and 2, landing gear 132 comprises a plurality of elongated legs that are configured to engage a landing surface. Each leg of landing gear 132 may include a curved foot that is configured to engage a landing surface. The legs and feet may be fabricated from a variety of materials including metals, plastics, and composites. Other configurations of the legs of landing gear 132 or other landing mechanisms may also be used. In some examples, the legs of landing gear 132 may be fabricated from one or more materials that exhibit some inherent resiliency to cushioning UAV 100 during landings, which can help absorb some of the impact when UAV 100 lands upon the landing surface. Other example of landing gear 132 of UAV 100 may include fewer or greater number of legs, which may be connected to different components of the vehicle than shown in the example of FIG. 1.

Figure 4:
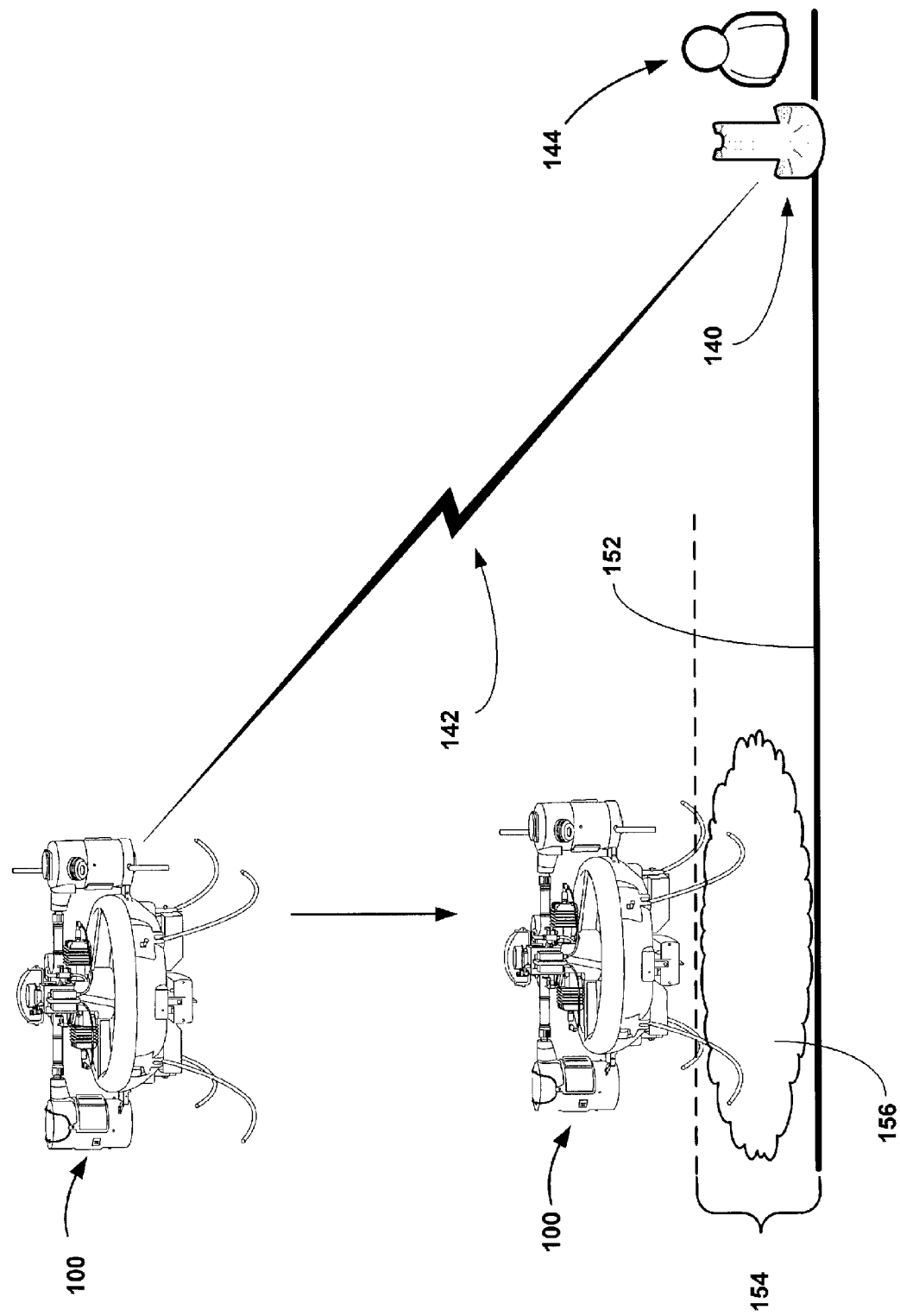
FIG. 4 is schematic illustration of an example system in which an example ground station can control the example UAV to land on a landing surface.

FIG. 4 is a schematic illustration of a system that includes UAV 100 and ground station 140, which are configured to communicate with each other. A ground station, such as a portable ground station 140 shown in FIG. 4, may be used to guide UAV 100, direct operation of UAV 100 (e.g., control the release of a payload, or control the operation of a sensor such as gimbaled camera 116), and/or receive data from one or more sensors aboard UAV 100, such as images from the gimbaled camera or cameras 116 shown in the example of FIG. 1. Ground station 140 communicates with UAV 100 via a wireless communications link 142, such as a RF communications link, or a link used for an analog or digital radio or communication via a wireless modem. An operator 144 at ground station 140 can program a flight path or portions of a flight path for UAV 100 or manually control the flight path or portions of the flight path. However, in some examples, UAV 100 is capable of running autonomously, executing missions such as a program or reconnaissance, which may be programmed by ground station 140 and sent to UAV 100 by communications link 142. In one example, UAV 100 runs under the manual control of operator 144.

After UAV 100 is in flight, UAV 100 can be landed on a landing surface, e.g., manually by an operator or automatically via a preprogrammed automatic landing sequence. For example, once a particular mission is complete and/or UAV 100 has reached a desired landing destination, processor 121 of avionics pod 114 or another controller on board UAV 100 or remote from UAV 100 (e.g., at ground station 140) can initiate the landing sequence. The landing sequence may also be initiated in mid-mission, such as for an emergency landing. The landing sequence causes UAV 100 to descend toward the landing surface, which may or may not be a predetermined landing surface. Processor 121 controls rotor 106 to cease rotation of rotor 106, such as by shutting down engine 108 or decoupling engine 108 from rotor 106, or to slow the rotational speed of rotor 106 before UAV 100 comes into contact with the landing surface.

If rotor 106 continues to create any air flow or, in some examples, a relatively high air flow when UAV 100 comes into contact with the landing surface, UAV 100 may not land cleanly, which can damage UAV 100. For example, when rotor 106 is rotating at a speed that is sufficient to create lift during a landing sequence or in close proximity to the landing surface, UAV 100 may skip or bounce off the landing surface in unpredictable ways, in some cases causing UAV 100 to flip over. Thus, processor 121 controls rotor 106 to cease rotating when UAV 100 is close to the landing surface. It is also desirable for processor 121 to control rotor 106 to continue rotating at a sufficient speed to create lift when UAV 100 is over a particular distance of the landing surface in order to help prevent UAV 100 falling from a height that may cause damage when UAV 100 contacts the landing surface. Therefore, UAV 100 includes a ground proximity sensor 150 (FIG. 2) that processor 121 utilizes to determine when UAV 100 is proximate the landing surface in order to control the rotation of rotor 106 during landing of UAV 100.

At the end of a flight, which can be planned or unplanned (e.g., an emergency landing), a UAV is typically instructed to initiate a landing sequence during which UAV descends toward a landing surface. The landing sequence may be initiated manually by an operator 144 using ground station 140 and communicated to UAV 100 by communications link 142, automatically as part of a programmed flight plan for UAV 100, such as a flight plan programmed into memory 123 and executed by processor 121, or automatically as part of an emergency landing sequence initiated by processor 121 or by ground station 140. UAV 100 includes a ground proximity sensor with which processor 121 detects when UAV 100 is within a predetermined distance from the landing surface, at which point the processor 121 controls rotor 106 to cease rotation (e.g., by shutting down engine 108) or to slow the rotational speed of rotor 106 in order to land UAV 100 on the landing surface. An unreliable ground proximity sensor may provide a near-ground indication when the UAV is at too high of an altitude. As a result, reliance on the unreliable ground proximity sensor can cause UAV 100 to fall from a height that is too great for its landing gear to absorb or from a height at which UAV 100 change orientation during the descent due to gravitational forces, and UAV 100 can be damaged, sometimes irreparably. An unreliable ground proximity sensor may also indicate that the UAV is close to the ground too late such that the rotor 106 is still creating lift when UAV 100 comes into contact with the landing surface, which may cause UAV 100 to skip off the landing surface or flip, also damaging UAV 100.

In order to help avoid these problems that can occur during landing, ground proximity sensor 150 of UAV 100 takes advantage of the phenomenon of ground effect that occurs when an aircraft is within a certain proximity to a landing surface, such as the ground. As described above, rotor 106 creates lift by forcing air downward through air duct 105 defined by duct housing 104. When UAV 100 is close enough to the landing surface, such that UAV 100 experiences the ground effect, the landing surface can restrict the downward flow of air, and an area of higher pressure, similar to a cushion of air, is created below UAV 100.

FIG. 4 provides a conceptual illustration of the ground effect. As UAV 100 descends from an altitude where no ground effect is experienced, it encounters an area close to the landing surface 152 where ground effect is experienced, referred to herein as the ground-effect zone 154. An area of increased pressure (shown as air cushion 156) is created beneath UAV 100 within ground-effect zone 154 as rotor 106 rotates and forces air through air duct 105. Ground effect generally will be experienced when landing surface 152 has a surface area that is generally equal to or greater than the area covered by the rotation of rotor 106, sometimes referred to as a rotor disc. Landing surface 152 may also be large enough to provide a large enough surface area for landing gear 132. In some examples of a ducted fan air vehicle like UAV 100, ground-effect zone 154 may be located at approximately one diameter d (shown in FIG. 3) of rotor 106 from ground level 152. The diameter d of rotor 106 may be measured as twice the length from the center of rotor 106 to a distal end of a vane 107, as shown in FIG. 3. In one example, the ground-effect zone 154 may be expected to occur at between about one-third and two-thirds of the diameter of rotor 106. However, the distance at which ground-effect zone is generated by UAV 100 can differ depending on the size (e.g., dimensions and/or weight) of the UAV. In one example, wherein the UAV comprises a plurality of rotors, such as a pair of two rotors that each provide lift for the UAV, then the UAV will experience ground effect when the UAV is within about one diameter of the rotor having the largest diameter of the landing surface. If each of the plurality of rotors have generally the same diameter, then the UAV will experience ground effect when the UAV is within about the length of the common diameter away from the landing surface.

When UAV 100 is at an altitude that is higher (e.g., further from landing surface 152) than ground-effect zone 154, a first pressure is exerted on a bottom surface of UAV 100. When UAV 100 descends into ground-effect zone 154, a second pressure that is higher than the first pressure is exerted on the bottom surface. The term "bottom surface" as it is used herein refers to a generally downward-facing surface (e.g., facing landing surface 152) of UAV 100 that may experience the pressure increase associated with ground effect within ground-effect zone 154, such as a bottom surface 158 of UAV housing 104 (shown in FIG. 2). Downward-facing surfaces other than bottom surface 158 may experience ground effect, and hence may be used as the location to measure for the pressure increase in ground-effect zone 154. UAV 100 (e.g., a processor of UAV 100, such as avionics processor 121) is configured to detect the increase from the first pressure to the second pressure exerted on the downward-facing surface and to determine when the increase in pressure corresponds to the ground effect caused by rotor 106.

Ground proximity sensor 150 includes a pressure sensor that generates a signal indicative of an air pressure proximate the downward-facing surface of UAV 100, such as bottom surface 158 of duct housing 104. A processor on board UAV 100 (e.g., avionics processor 121) or a processor remote from UAV 100 (e.g. a processor of a ground station 140) receives the signal generated by ground proximity sensor 150 and monitors the signal to determine whether the signal indicates that an increase in pressure proximate bottom surface 158 over time indicates the ground effect caused by rotor 106 is present. The processor can monitor the signal generated by sensor 150 during at least a time period beginning at the time at which UAV 100 initiates the landing sequence (e.g., when UAV 100 is not in ground-effect zone 154) and, in some examples, ending when the landing sequence has ceased, e.g., when UAV 100 has completed the landing sequence by contacting the landing surface, or when the landing sequence has been aborted. In some examples, the processor determines whether the pressure has increased by a threshold amount relative to a first time at which the landing sequence was initiated or relative to an air pressure determined when UAV 100 was known to be in flight and not within ground-effect zone 154.

While the remainder of the description primarily refers to avionics processor 121 on board UAV 100 as receiving the signal generated by sensor 150, determining whether UAV 100 is proximate a landing surface based on the signal, and otherwise controlling the landing of UAV 100, in other examples, another processor, alone or in combination with processor 121, can perform any of the techniques performed by avionics processor 121 described herein. The other processor can be on board UAV 100 or can be remotely located, e.g., at ground station 140, which may or may not be within site of UAV 100 when UAV 100 is in flight.

After determining the signal generated by sensor 150 indicates that an increase in pressure proximate bottom surface 158 of UAV 100 indicates the ground effect caused by rotor 106 is present, processor 121 may control rotor 106 to cease rotating or to decrease its rotational speed so that UAV 100 will land on the landing surface. Because the ground effect only occurs when UAV 100 is close to the landing surface, e.g., when UAV 100 is in ground-effect zone 154, ground proximity sensor 150 provides a reliable method of determining when UAV 100 is close to the landing surface. In some examples, rotor 106 of UAV 100 has a rotor size that is sufficiently small so that there is relatively little concern for damage so long as rotor 106 is stopped from rotating when UAV 100 is experiencing ground effect. For example, when UAV 100 is a single rotor micro air vehicle (MAV), the rotor may have a diameter of between about 0.15 meters (about 0.5 feet) and about 1 meter (about 3.3 feet). In one example, UAV 100 is a MAV having a rotor diameter of about 0.3 meters (about 1 foot) such that, if UAV 100 experiences ground effect at a distance above the ground of about one rotor diameter, ground proximity sensor 150 will detect the ground effect at about 0.3 meters from the ground, and, thus, when UAV 100 is about 0.3 meters from the ground, processor 121 will control rotor 106 to cease or slow the rotational speed of rotor 106 so that UAV 100 can land from a safe distance from ground.

Ground proximity sensor 150 may be located anywhere on UAV 100 so long as it is determining the pressure proximate a generally downward-facing surface of UAV 100, such as bottom surface 158, where the increase in air pressure due to the ground effect is experienced. In one example, shown in FIG. 2, ground proximity sensor 150 comprises a pressure sensor, such as a pressure transducer, located within center body 110. The pressure sensor can comprise a static or dynamic pressure sensor. In one example in which ground proximity sensor 150 comprises a dynamic pressure sensor, duct housing 104 can define openings through which air proximate bottom surface 158 of UAV 100 is introduced through duct housing 104, and sensor 150 can determine the pressure proximate bottom surface 158 based on the air flow through duct housing 104. For example, one or more port holes 160 may be formed through bottom surface 158 of a lip 162 of duct housing 104 (best seen in FIG. 3). Internal channels 164, such as tubing, are pneumatically plumbed from port holes 160 to ground proximity sensor 150 so that there is fluid communication between port hole 160 and ground proximity sensor 150 such that the pressure at the one or more port holes 160 may be measured remotely at ground proximity sensor 150.

A single port hole may be sufficient to provide fluid communication between the port hole and ground proximity sensor 150. In the example shown in FIGS. 2 and 3, two port holes 160 are provided in housing 104 in order to provide redundancy. In one example, each port hole 160 is pneumatically plumbed to ground proximity sensor 150 by a separate channel 164. However, the channels 164 from at least two port holes 160 could join together before entering ground proximity sensor 150. In one example, best seen in FIG. 3, the two port holes 160 are diametrically opposed from one another on lip 162 of housing 104. In another example, not shown, three port holes may be provided that are spaced around lip 162, for example the three port holes may be evenly spaced around lip 162 such that each port hole is about 120 degrees from its neighboring port holes. Similarly, other numbers of evenly spaced or unevenly spaced port holes could be used, such as four port holes that are spaced about 90 degrees apart, five port holes that are spaced about 72 degrees apart, six port holes that are located about 60 degrees apart, and so on. The pressure sensor 150 could also be located in either pod 112, 114, or could be located directly on bottom surface 158 of duct housing 104.

Figure 5:
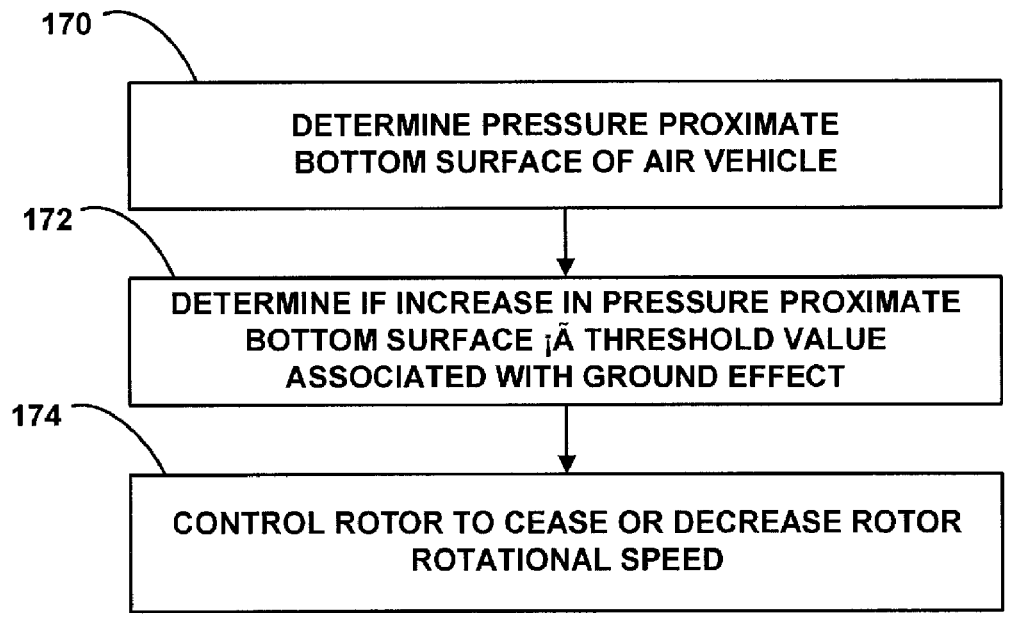
FIG. 5 is a flow diagram of an example method for determining when an air vehicle is proximate to a landing surface.

FIG. 5 is a flow diagram of an example technique for determining when UAV 100 is proximate the ground. The example method includes determining a pressure proximate bottom surface 158 of UAV 100 (170), such as by ground proximity sensor 150 generating a signal indicative of the air pressure proximate bottom surface 158 and processor 121 analyzing the signal and determining an air pressure that corresponds to the signal. Next, processor 121 determines if an increase in air pressure proximate bottom surface 158, as indicated by a change in the signal generated by ground proximity sensor 150, is greater than or equal to a calculated threshold value that is associated with the ground effect of rotor 106 (172). As described in more detail below, the threshold value corresponds to the pressure increase that is expected to be experienced proximate bottom surface 158 of UAV 100. The pressure increase may be from a first point in time in which UAV 100 is known to not be within ground-effect zone 154 (FIG. 4), such as when UAV 100 is in flight (e.g., upon initiation of the landing sequence of UAV 100). The threshold value may depend on several factors including the thrust produced by rotor 106, the total volume of UAV 100, the surface area of bottom surface 158, and characteristics of the air surrounding UAV 100, such as air density, which in turn may be dependent on static air pressure, static air temperature, and air humidity. It some examples, processor 121 may estimate air density without knowledge of an exact air humidity level. If processor 121 determines that the increase in pressure at bottom surface 158 is equal to or greater than the threshold value, then processor 121 controls rotor 106 to cease or decrease its rotational speed (174), such as by shutting down engine 108.

Figure 6:
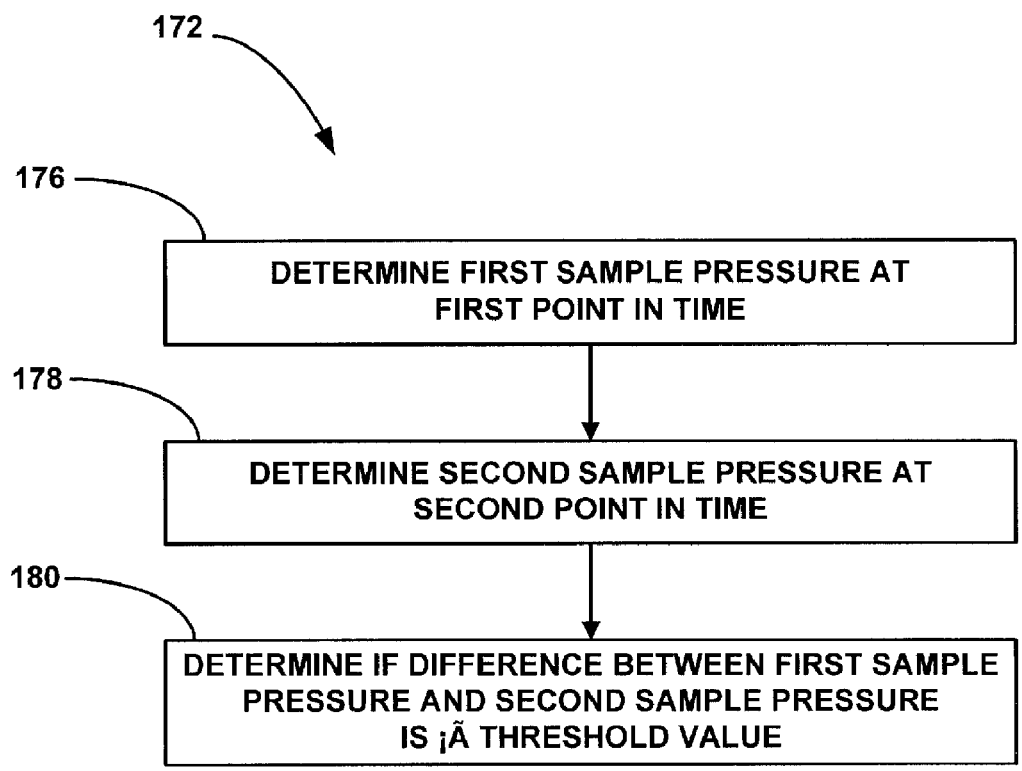
FIG. 6 is a flow diagram of an example method for determining if an increase in pressure proximate a bottom surface of the air vehicle is associated with ground effect.

FIG. 6 is a flow diagram of an example method that processor 121 may implement to determine if an increase in air pressure proximate is equal to or greater than threshold value (172). In the example method of FIG. 6, processor 121 determines a first sample pressure proximate bottom surface 158 at a first point in time (176), wherein the first point in time is when UAV 100 is known to be above ground-effect zone 154, such as at the initiation of a landing sequence. For example, processor 121 may receive a first signal generated by ground proximity sensor 150, where the first signal is indicative of the air pressure proximate bottom surface 158 at the first point in time. Processor 121 may determine an air pressure value based on the first signal, e.g., based on a characteristic of the signal, such as an instantaneous, mean, median, peak or lowest amplitude within a certain segment of the signal, a frequency of the signal, or the signal pattern. In some examples, processor 121 may store the air pressure value of the first sample pressure in memory 123.

Next, processor 121 determines a second sample pressure proximate bottom surface 158 at a second point in time (178), such as while UAV 100 is descending during a landing sequence. For example, processor 121 can receive the signal generated by ground proximity sensor 150 (referred to herein as a second signal due to the segment of the signal being different than that generated at the first point in time) at the second point in time and processor 121 can determine an air pressure value based on the second signal. As with the first signal, processor 121 may determine an air pressure value based on a characteristic of the second signal, such as an instantaneous, mean, median, peak or lowest amplitude within a certain segment of the signal, a frequency of the signal, or the signal pattern. Processor 121 may also store the air pressure value of the second sample pressure in memory 123.

Next, processor 121 determines if a difference between the first sample pressure and the second sample pressure is equal to or greater than a threshold value (180). The threshold value can be stored in memory 123 of UAV 100 or another memory, such as a memory at ground station 140 (FIG. 4). In some examples, the threshold value is predetermined by an operator, e.g., at a time prior to the current flight mission of UAV 100 or prior to the initiation of the landing sequence.

In one example, processor 121 is configured to determine the increase in pressure associated with the ground effect by being configured to take a sample and holding a pressure signal from ground proximity sensor 150 when UAV 100 is not experiencing ground effect, and comparing the held pressure signal to the pressure signal as UAV 100 descends until a difference between the most recently taken pressure signal and the held pressure signal is greater than or equal to a predetermined threshold value.

Figure 7:
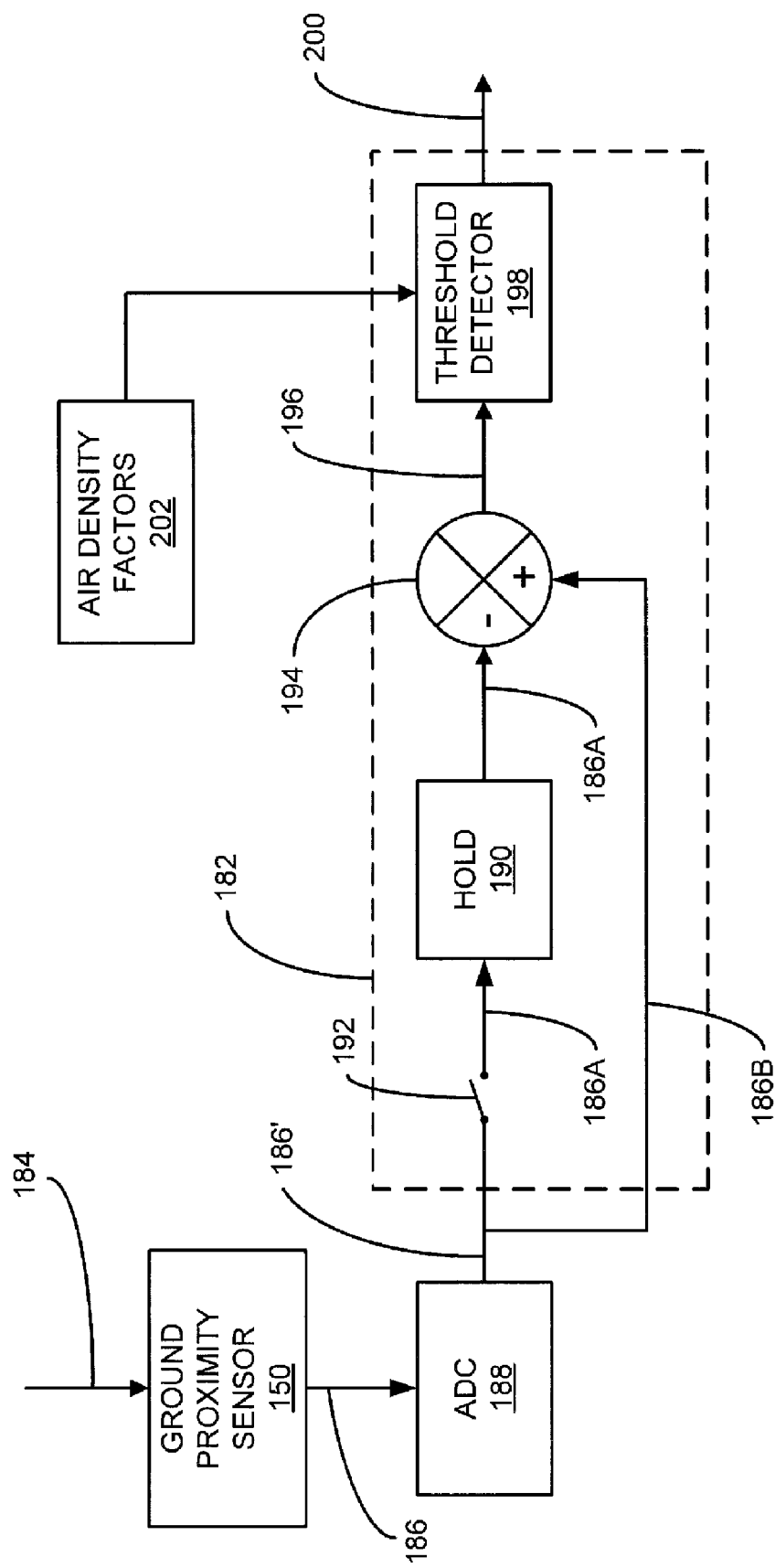
FIG. 7 is a functional block diagram of an example ground proximity sensor landing system for an air vehicle, where the landing system can be utilized to determine if the air vehicle is proximate to a landing surface.

FIG. 7 is a functional block diagram of a ground proximity sensor system of UAV 100, which can be utilized to determine if the air vehicle is proximate to a landing surface. The ground proximity sensor system shown in FIG. 7 includes ground proximity sensor 150, an analog-to-digital converter (ADC) 188, a hold block 190, a difference junction 194, and a threshold detector 198. The functional block diagram shown in FIG. 7 illustrates how pressure signals from ground proximity sensor 150 may be used to determine when UAV 100 is experiencing ground effect such that it can be determined that UAV 100 is proximate the ground. The example process of the block diagram of FIG. 7 may be performed by hardware components or by a processor 182, such as avionics processor 121 (FIG. 2), executing software, such as software instructions that may be part of flight-control software loaded onto UAV 100.

As shown in FIG. 7, ground proximity sensor 150 measures a pressure input 184, e.g., the pressure at bottom surface 158 of housing 104, and generates an output signal 186 corresponding to the value of pressure input 184. In one example, output signal 186 is an analog signal 186, such as a voltage signal, with a value that corresponds to the value of pressure input 184, e.g., the higher the pressure measurement of pressure input 184, the higher the voltage of output signal 186. If the process of FIG. 7 is to be performed by software running on processor 182, than the analog signal 186 is converted to a digital signal 186' by ADC 188. If the process of FIG. 7 is to be performed by hardware components, than analog output signal 186 does not need to be converted and ADC 188 is not required.

When UAV 100 is not experiencing ground effect, e.g., upon initiation of a landing sequence or when UAV 100 is flying at an altitude above ground-effect zone 154, a sample of output signal 186, 186' of ground proximity sensor 150 is taken and held until UAV 100 completes the landing sequence (represented schematically by hold block 190 in FIG. 7). In FIG. 7, the output signal that is held, e.g., the output signal corresponding to the pressure input when ground effect is not experienced, is represented as output signal 186A. In one example, hold block 190 comprises a software instruction executed by processor 182 to store the value of digital signal 186' in memory, such as memory 123 shown in FIG. 2 or another memory (e.g., remotely located relative to UAV 100), as held signal 186A. In another example, hold block 190 comprises a sample and hold hardware device comprising a capacitor with a switch 192 that is closed when the signal 186A is to be sampled, so that the capacitor will be charged to the same voltage as analog output signal 186. Switch 192 is then opened to store the analog output signal 186 as held output signal 186A. For example, prior to or at the initiation of a landing sequence, switch 192 may be closed so that the capacitor of hold block 190 can take a sample value as held output signal 186A. Once the sample is taken, switch 190 is opened so that the held value of output signal 186A will remain in hold block 190.

After output signal 186A is sampled and held when UAV 100 is not experiencing ground effect, the output signal of ground proximity sensor 150 as UAV 100 descends is repeatedly compared to held output signal 186A. Ground proximity sensor 150 can continuously transmit the signal to ADC 188 or can periodically send the signal. In FIG. 7, the output signal as UAV 100 descends is represented as output signal 186B and is referred to herein as the present or most recent output signal 186B. In one example, present output signal 186B is compared to held output signal 186A at a frequency of between about 1 Hz and about 100 Hz, such as between about 2 Hz and about 10 Hz. As shown in the example of FIG. 7, present output signal 186B is compared to held output signal 186A at difference junction 194 that subtracts held output signal 186A from the present output signal 186B to produce a difference signal 196. In one example, difference junction 194 is a software instruction executed by processor 182 that simply subtracts the digital value of held signal 186A from the digital value of present output signal 186B to produce a digital difference value 196 that may be stored in memory, such as memory 123 (FIG. 2). In another example, difference junction 194 comprises a hardware component comprising a circuit that can compare the difference between an analog held signal 186A and an analog present output signal 186B to produce an analog difference signal 196, such as a differential amplifier circuit that compares analog voltage output signals.

Difference signal 196 output by difference junction 194 is fed into a threshold detector 198 that determines if the difference between held output signal 186A and present output signal 186B is greater than or equal to a predetermined threshold value that corresponds to the ground effect. If threshold detector 198 determines that the difference between held output signal 186A and present output signal 186B is greater than or equal to a predetermined threshold value, threshold detector 198 generates an output signal 200 indicating that ground effect is being experienced. In response to receiving output signal 200 or an indication that signal 200 was generated, processor 182 can control rotor 106 to cease rotating, such as by shutting down engine 108, or to decrease the rotational speed of rotor 106 to facilitate landing of UAV 100.

In one example, threshold detector 198 comprises a software instruction run by processor 182 that determines if the difference value 196 is greater than or equal to the predetermined threshold value. If the difference value 196 is greater than or equal to the predetermined threshold value, threshold detector 198 generates output signal 200, which can be, for example, an instruction received by processor 182 that indicates a ground effect is present. In another example, threshold detector 198 comprises a hardware component comprising a circuit that can determine if analog difference signal 196 is greater than or equal to a threshold value. For example, threshold detector 198 can comprise a comparator that can compare a voltage difference signal 196 to a predetermined threshold value voltage that corresponds to a pressure difference that is associated with ground effect to determine which is greater. For example, if the voltage of difference signal 196 is less than the threshold value voltage then the output from a comparator will have a first value, and if the voltage of difference signal 196 is greater than the threshold value voltage then the output from the comparator will have a second value. Threshold detector 198 may be configured to recognize when the output from the comparator is the second value corresponding to difference signal 196 being greater than the predetermined threshold value and to generate output signal 200 indicating that ground effect is being experienced when the output from the comparator is the second value The predetermined threshold value is selected to correspond to an expected increase in pressure proximate bottom surface 158 when UAV 100 is in ground-effect zone 154 (FIG. 4). In one example, the threshold value is set so that UAV 100 ceases to rotate rotor 106 or decreases the rotational speed of rotor 106 at a particular absolute, geometric altitude, such as the difference in pressure that is experienced by UAV 100 at between about 0.15 meters (about 0.5 feet) and about 1 meter (about 3.3 feet) from the landing, for example about 0.3 meters (about 1 foot) from the landing surface. In one example, the desired absolute altitude where rotor 106 is stopped or slowed is selected depending on the weight of UAV 100 and the strength of landing gear 132. For example, if UAV 100 is particularly heavy, and landing gear 132 can only withstand a certain force prior to breakage or compromising the integrity of landing gear 132, the predetermined threshold value may be set so that it is experienced within a distance from the ground that is small enough so that landing gear 132 will not have to withstand more force than landing gear 132 is configured to withstand without breakage or a decrease in the integrity of landing gear 132. The threshold value may be determined based on calculations or models of the expected pressure difference that may be experienced by UAV 100 at a particular absolute altitude as part of the ground effect created by rotor 106. The threshold value also may be determined by experimentation of a particular UAV 100, such as when the particular UAV 100 is manufactured or in the field.

In one example, the predetermined threshold value may be set based on one or more physical characteristics of UAV 100. In one example, the size of UAV 100, such as the overall volume of UAV 100 or the cross-sectional area or footprint area of UAV 100, may affect the pressure increase that will be experienced at bottom surface 158 because it may affect the amount of air below UAV 100 that forms area of increased pressure/air cushion 156 (FIG. 4). The weight of UAV 100 may also affect the calculated threshold value. In one example, an estimated weight of UAV 100 is used to determine the threshold value. The weight of UAV 100, which changes during flight due to fuel consumption, may be estimated based on a weight of UAV 100 when a fuel container (e.g., a fuel tank or a fuel bladder) of UAV 100 is empty (e.g., an "empty weight"), the weight of fuel added to the fuel container of UAV 100, and an estimation of the fuel consumed during flight. The thrust produced by UAV 100, which may be altered by changing the rotor speed, may also affect the pressure increase because an increase in thrust may result in a larger amount of air being forced into the area of air cushion 156, and, thus, may increase the pressure difference at bottom surface 158.

In another example, the threshold value may be set based on characteristics of the air (e.g., environmental factors) in which UAV 100 is flying. An example of an air characteristic that affects the amount of the change in pressure associated with ground effect is the air density of the air surrounding UAV 100. For example, as the air density increases, the pressure increase that is experienced by UAV 100 in ground-effect zone 154 (FIG. 4) increases. Thus, in one example, air density factors 202 of the air around UAV 100 are taken into consideration when setting the threshold value, as shown in FIG. 7, such that if the air density changes, the threshold value is also changed. Air density is dependent on the static air pressure, static air temperature, air humidity, and other factors. In one example, UAV 100 may include additional sensors to detect the static air pressure, static temperature, and air humidity, which may be used by processor 121 to determine the air density. Once processor 121 determines the air density, processor 121 modifies the threshold value accordingly.

In one example, the threshold value is set as a function of the density altitude of the air around UAV 100. Density altitude is one way of approximating the effect of the local air density on UAV 100. Density altitude at a particular location in space is defined as the altitude in a standard atmosphere model, such as the International Standard Atmosphere (ISA) or the United States Standard Atmosphere, at which the air density would be equal to the actual air density at the particular location. Density altitude may be calculated as a function of the static air pressure, static air temperature, and air humidity. In some cases, the effects of air humidity may be ignored such that density altitude may be calculated based on static air pressure and static air temperature alone. In either case, UAV 100 may be configured to determine its density altitude.

In one example, a processor, such as avionics processor 121, determines the density altitude of UAV 100 by using measured values from a static air pressure sensor (not shown), a static air temperature sensor (not shown), and, if desired, an air humidity sensor, that are provided with UAV 100. In one example, processor 121 may use a model equation that approximate density altitude using the measured static air pressure, static air temperature, and air humidity as inputs. In another example, one or more tables that include density altitude values at various conditions may be stored in memory, such as memory 123, and accessed by processor 121. Processor 121 may use the measured values of static air pressure, static air temperature, and air humidity to find the appropriate density altitude from the stored table(s).

Once processor 121 has determined the density altitude of the air around UAV 100, processor 121 may automatically set (e.g., initially set or adjust) the threshold value based on the calculated density altitude of UAV 100. In one example, processor 121 determines the density altitude of the air around UAV 100 at or before the initiation of a landing sequence, and the threshold value is set by processor 121 according to the calculated density altitude. Processor 121 may also be configured to determine density altitude of the air around UAV 100 at one or more times during the descent of UAV 100 in order to confirm and/or update the determined density altitude.

The extent to which the density altitude may affect the threshold value will depend on characteristics of the particular UAV 100, such as the size or weight of UAV 100. However, in general, a lower density altitude equates to a higher local air density, and, thus, a lower density altitude can reflect a higher change in pressure when UAV 100 is experiencing ground effect. In one example, the threshold value may be determined by setting a baseline threshold value, which can be, for example, the change in pressure that is expected at bottom surface 158 under standard atmospheric conditions between a first time when UAV 100 is known not to be under the influence of the effect and a second time when UAV 100 is under the influence of the ground effect, and adjusting the actual threshold value upwards or downwards from the baseline threshold value depending on the determined density altitude of UAV 100.

Density altitude is generally proportional to air temperature and humidity, and generally inversely proportional to static pressure. For example, as the air temperature or air humidity increases, the density altitude also increases, meaning that the change in pressure experienced by UAV 100 in ground-effect zone 154 will tend to get smaller. In such a case, processor 121 may automatically reduce the threshold value used to detect if ground effect is being experienced. As air pressure increases, the density altitude decreases, and, as a result, the change in pressure experienced by UAV 100 in ground-effect zone 154 may increase as density altitude decreases. When this happens, processor 121 may automatically increase the threshold value used to detect ground effect. Therefore, depending on the value of the density altitude calculated for UAV 100, the threshold value may be adjusted upward or downward. In some examples in which processor 121 automatically adjusts a threshold value, processor 121 may prompt an operator (e.g., by transmitting a signal to ground station 140) for confirmation that the threshold value should be modified. In other examples, processor 121 may automatically adjust the threshold value without user intervention.

In one example, shown in FIG. 7, air density factors 202 are determined, such as by processor 121 determining the air density around UAV 100 or the density altitude of the air around UAV 100, and are used by threshold detector 198 to adjust the threshold value that is compared to difference signal 196.

Figure 8:
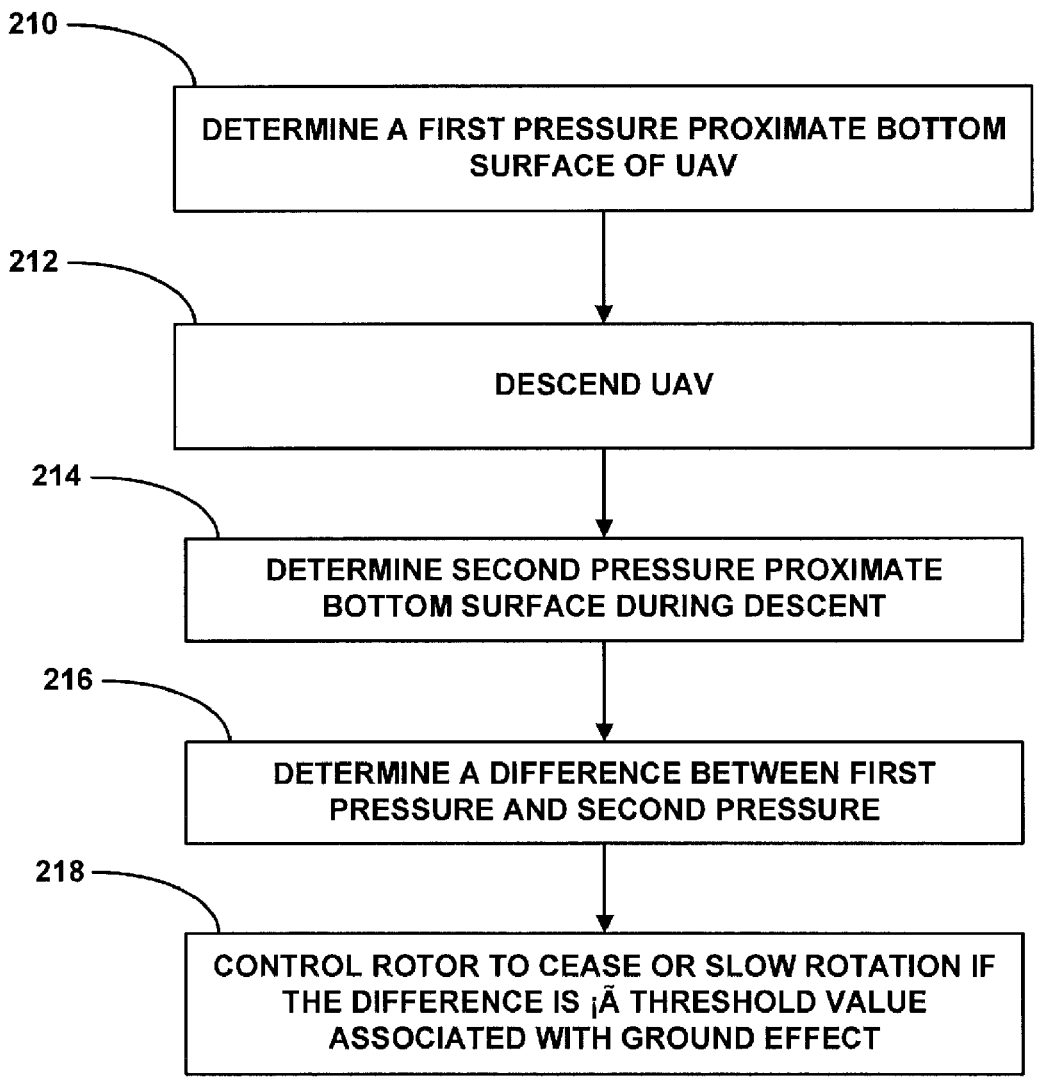
FIG. 8 is a flow diagram of an example method for determining when an unmanned aerial vehicle is proximate to a landing surface.

FIG. 8 is a flow diagram illustrating an example method of using the sample-and-hold calculations described above with respect to FIG. 7 to control a landing of UAV 100. The example method of FIG. 8 includes determining a first pressure proximate bottom surface 158 of UAV 100 when UAV 100 is not experience ground effect (210). For example, avionics processor 121 can receive a first signal generated by ground effect sensor 150 at a first point in time, where the first signal is indicative of the air pressure proximate bottom surface 158 and determine an air pressure value based on the first signal. In one example, the first pressure may be determined when UAV 100 is known to be outside of ground-effect zone 154, such as before or at the initiation of a landing sequence. Next, processor 121 controls descent of UAV 100 (212) and, during the descent, processor 121 determines a second pressure proximate bottom surface 158 (214). For example, processor 121 can receive a second signal generated by ground effect sensor 150 at a second point in time, where the second signal is indicative of the air pressure proximate bottom surface 158 during the descent of UAV 100. Processor 121 may determine the air pressure proximate bottom surface 158 during the descent of UAV 100 based on the second signal.

Next, processor 121 determines a difference between the first pressure and the second pressure (216). If the difference between the first pressure and the second pressure is greater than or equal to a threshold value associated with ground effect of rotor 106, processor 121 controls rotor to cease or decrease the rotational speed of rotor 106 in order to land UAV 100 (218) on a landing surface. If the difference between the first pressure and the second pressure is less than the threshold value associated with ground effect, then processor 121 continues to direct the descent of UAV 100 according to the landing sequence until the point UAV 100 descends to a point where processor 121 determines that the difference between the first pressure and the second pressure is greater than or equal to the threshold value.

The techniques described in this disclosure, including those attributed to a "processor" such as processors 121 and 182 may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, or firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed to support one or more aspects of the functionality described in this disclosure.

This disclosure refers to illustrative examples that are not meant to be construed in a limiting sense. Various modifications of the illustrative examples, as well as additional examples of the disclosure, will be apparent to persons skilled in the art upon reference to this description.

The invention claimed is:

1. An unmanned aerial vehicle comprising:
    a housing;
    a rotor that is rotated to propel the housing;
    a pressure sensor that generates a signal indicative of an air pressure proximate a bottom surface of the housing; and
    a processor configured to determine, based on the signal, when an increase in air pressure proximate the bottom surface is greater than or equal to a threshold value associated with the ground effect of the rotor, wherein the processor controls the rotor to cease rotating or decrease rotational speed to land the unmanned aerial vehicle upon determining that the increase in pressure is greater than or equal to the threshold value.

2. The unmanned aerial vehicle of claim 1, wherein the processor determines when the increase in pressure proximate the bottom surface is greater than or equal to the threshold value by at least determining a difference between a first sample pressure and a second sample pressure, wherein the processor determines the first sample pressure based on the signal at initiation of a landing sequence of the unmanned aerial vehicle and determines the second sample pressure based on the signal during the landing sequence.

3. The unmanned aerial vehicle of claim 1, wherein the signal comprises a first signal generated by the pressure sensor at a first point in time and a second signal generated by the pressure sensor at a second point in time, wherein the processor determines when the increase in pressure proximate the bottom surface is greater than or equal to the threshold value by at least determining a first sample pressure value based on the first signal, determining a second sample pressure value based on the second signal, and determining if a difference between the first sample pressure value and the second sample pressure value is greater than or equal to the threshold value, wherein the processor controls the rotor to cease rotating or decrease rotational speed to land the unmanned aerial vehicle when the difference is equal to or greater than the threshold value.

4. The unmanned aerial vehicle of claim 1, wherein the threshold value is based on at least one of: air density of air surrounding the unmanned air vehicle or a density altitude of air surrounding the unmanned air vehicle, a size of the housing, a weight of the unmanned aerial vehicle, or a thrust generated by the rotor.

5. The unmanned aerial vehicle of claim 1, wherein the threshold value is a function of an estimated weight of the unmanned aerial vehicle when a fuel container of the unmanned aerial vehicle is empty, a weight of fuel added to the fuel container of the unmanned aerial vehicle, and an estimated weight of fuel consumed.

6. The unmanned aerial vehicle of claim 1, further comprising a port defined by the bottom surface of the housing, the pressure sensor being pneumatically plumbed to the port.

7. The unmanned aerial vehicle of claim 6, further comprising a second port defined by the bottom surface of the housing, wherein the pressure sensor is also pneumatically plumbed to the second port.

8. The unmanned aerial vehicle of claim 1, wherein the threshold value corresponds to a predetermined height of the bottom surface of the housing relative to a landing surface.

9. The unmanned aerial vehicle of claim 8, wherein the predetermined height corresponds to a diameter of the rotor.

10. The unmanned aerial vehicle of claim 8, wherein the predetermined height is between about 0.15 meters and about 1 meter.

11. The unmanned aerial vehicle of claim 1, wherein the processor is configured to determine, based on the signal, when the increase in air pressure proximate the bottom surface is greater than or equal to the threshold value associated with the ground effect of the rotor during a landing sequence of the unmanned aerial vehicle.

12. A method comprising:
    determining a pressure proximate a bottom surface of an air vehicle, the air vehicle comprising a rotor for propelling the air vehicle;
    determining if an increase in air pressure proximate the bottom surface of the air vehicle is greater than or equal to a threshold value associated with ground effect of the rotor; and controlling the rotor to cease rotation or slow rotational speed to land the air vehicle upon determining that the increase in pressure is greater than or equal to the threshold value.

13. The method of claim 12, wherein determining if the increase in pressure is equal to the threshold value comprises:
   determining a first sample pressure proximate the bottom surface at a first point in time;
   determining a second sample pressure proximate the bottom surface at a second point in time; and
   determining if the difference between the first sample pressure and the second sample pressure is equal to or greater than the threshold value.

14. The method of claim 13, further comprising descending the air vehicle in a landing sequence, wherein the first sample pressure is taken prior to or at the initiation of the landing sequence of the air vehicle, and the second sample pressure is taken while the air vehicle is descending.

15. The method of claim 12, further comprising determining the threshold value based on a characteristic of air surrounding the air vehicle prior to determining if the increase in air pressure proximate the bottom surface of the air vehicle is greater than or equal to the threshold value.

16. The method of claim 15, wherein the characteristic of the air surrounding the air vehicle is at least one of an air density of the air surrounding the air vehicle or a density altitude of the air surrounding the air vehicle.

17. The method of claim 12, wherein the threshold value is based on at least one of: a size of the air vehicle, a weight of the air vehicle, or a thrust created by the rotor.

18. The method of claim 12, wherein the threshold increase in pressure corresponds to a predetermined height of the bottom surface of the air vehicle relative to a landing surface.

19. The method of claim 12, wherein determining the pressure proximate the bottom surface of the air vehicle comprises receiving a signal generated by a pressure sensor, wherein the signal is indicative of the pressure proximate the bottom surface of the air vehicle.

20. A computer-readable medium comprising instructions for causing a programmable processor to:
   determine a pressure proximate a bottom surface of an air vehicle, the air vehicle comprising a rotor for propelling the air vehicle;
   determine if an increase in air pressure proximate the bottom surface of the air vehicle is greater than or equal to a threshold value associated with ground effect of the rotor; and
   control the rotor to cease rotation or slow rotational speed to land the air vehicle upon determining that the increase in pressure is greater than or equal to the threshold value.

* * * * *